US012140266B2

(12) United States Patent
Starks et al.

(10) Patent No.: US 12,140,266 B2
(45) Date of Patent: Nov. 12, 2024

(54) ROTARY REGENERATIVE MACHINE STRUCTURE

(71) Applicant: ARVOS LJUNGSTROM LLC, Wellsville, NY (US)

(72) Inventors: William J. Starks, Wellsville, NY (US); Mark S. Antes, Wellsville, NY (US); Nicholas A. Fuller, Angelica, NY (US)

(73) Assignee: ARVOS LJUNGSTROM LLC, Wellsville, NY (US)

( * ) Notice: Subject to any disclaimer, the term of this patent is extended or adjusted under 35 U.S.C. 154(b) by 0 days.

(21) Appl. No.: 18/694,022

(22) PCT Filed: Feb. 28, 2023

(86) PCT No.: PCT/US2023/014123
§ 371 (c)(1),
(2) Date: Mar. 21, 2024

(87) PCT Pub. No.: WO2023/219697
PCT Pub. Date: Nov. 16, 2023

(65) Prior Publication Data
US 2024/0263732 A1 Aug. 8, 2024

Related U.S. Application Data

(60) Provisional application No. 63/341,785, filed on May 13, 2022.

(51) Int. Cl.
*F16M 1/00* (2006.01)
*B01D 53/06* (2006.01)
(Continued)

(52) U.S. Cl.
CPC ............... *F16M 1/04* (2013.01); *B01D 53/06* (2013.01); *B01D 2257/504* (2013.01);
(Continued)

(58) Field of Classification Search
CPC ...... F28D 19/00; F28D 19/041; F28D 19/042; F28D 19/044; F28D 19/048; B01D 53/06;
(Continued)

(56) References Cited

U.S. PATENT DOCUMENTS

| 4,305,594 A | 12/1981 | Handa |
| 5,913,359 A | 6/1999 | Milligan et al. |

(Continued)

FOREIGN PATENT DOCUMENTS

| CN | 201234187 Y | * | 5/2009 | |
| CN | 102365810 A | * | 2/2012 | ........... F04D 25/082 |

(Continued)

OTHER PUBLICATIONS

International Search Report and Written Opinion issued in corresponding PCT Application No. PCT/US2023/014123, date mailed Jun. 16, 2023, pp. 1-8.

*Primary Examiner* — Tan Le
(74) *Attorney, Agent, or Firm* — Robinson & Cole LLP (57) ABSTRACT

A support structure for a rotary regenerative machine or rotary absorption machine (RAM), the support structure including an upper stator and a lower stator axially spaced apart from one another by a first segment of at least two pedestals, the first segment of each pedestal extending between the upper stator and the lower stator, and an upper rotor bearing housing mount disposed above a lower surface of the upper stator, the rotor bearing housing mount is attached to the upper stator by at least one radially extending bearing support structure, wherein a radially inner end of at least one of the radially extending bearing support structure is attached to the bearing housing mount and a radially outer end of the at least one radially extending bearing support structure is proximate a top portion of the first segment of each of the pedestals.

25 Claims, 7 Drawing Sheets

(51) Int. Cl.
  *F16M 1/04*   (2006.01)
  *F28D 19/04*  (2006.01)
  *F28F 9/00*   (2006.01)
  *F28D 19/00*  (2006.01)
  *F28F 9/007*  (2006.01)

(52) U.S. Cl.
  CPC ............ *F28D 19/00* (2013.01); *F28D 19/042* (2013.01); *F28D 19/048* (2013.01); *F28F 9/007* (2013.01); *F28F 2280/00* (2013.01)

(58) Field of Classification Search
  CPC .......... B01D 53/96; B01D 2259/40088; B01D 2258/06; F28F 2225/02; F28F 2280/00; F16M 1/00
  See application file for complete search history.

(56) References Cited

U.S. PATENT DOCUMENTS

| | | | |
|---|---|---|---|
| 6,237,674 | B1 | 5/2001 | Larkin et al. |
| 11,486,653 | B2 * | 11/2022 | Starks, Jr. ............. F28D 19/048 |
| 2008/0260311 | A1 | 10/2008 | Thelen et al. |
| 2017/0328649 | A1 | 11/2017 | Brandmeier et al. |
| 2021/0199388 | A1 | 7/2021 | Bracey |
| 2022/0146208 | A1 * | 5/2022 | Stark, Jr. ............... F28D 19/042 |

FOREIGN PATENT DOCUMENTS

| | | | | |
|---|---|---|---|---|
| CN | 103917761 | A * | 7/2014 | ............. F01D 11/08 |
| CN | 209462149 | U * | 10/2019 | |
| WO | 2020231381 | A1 | 11/2020 | |

\* cited by examiner

ROTARY REGENERATIVE MACHINE STRUCTURE

CROSS-REFERENCE TO RELATED APPLICATIONS

The instant application is a non-provisional application of, and claims priority to PCT Application No. PCT/US2023/014123, filed on Feb. 28, 2023, which is a PCT application of and claims priority to U.S. Provisional Application No. 63/341,785, filed on May 13, 2022, which is incorporated by reference in its entirety.

FIELD

The present invention relates to rotary regenerative machines generally, and more particularly to a support structure and a rotor for a rotary regenerative machine adapted to be a rotary absorption machine (RAM) suitable for use in carbon capture applications when the rotor assembly thereof is loaded with an adsorbent material configured to absorb carbon dioxide ($CO_2$) from a first gaseous stream comprising air or flue gas and liberate $CO_2$ to generate a second gaseous stream with a much higher concentration of $CO_2$ for downstream collection and sequestration.

BACKGROUND

Carbon capture technology (also referred to as "$CO_2$ capture systems") is usable in fossil fuel power plant systems or any other plant in which $CO_2$ removal from a gas stream is desired, e.g., in direct air capture (DAC) systems. One such carbon capture technology utilizes a thermal swing adsorption (TSA) system. RAMs in TSA systems are based on the general well-known mechanical principles of conventional air preheater (APH) of the rotary regenerative heat exchanger machines type but have different duct and sealing arrangements and use rotor assemblies that house adsorption media rather than the metallic heat transfer elements usually employed in APH. One such low-profile RAM of spoked stator ring construction and designed to be employed in $CO_2$ capture systems is described in WO2020231381A1 (Applicant's LoPro™ RAM). A historic APH design having a spoked outer casing support is described in U.S. Pat. No. 6,237,674B1 (Applicant's Spoked Casing Support APH). The detailed descriptions of both citations are imported herein and/or recognized as fully part of the intended addressees' general prior art knowledge of Applicant's published APH and RAM designs.

Figure 1:
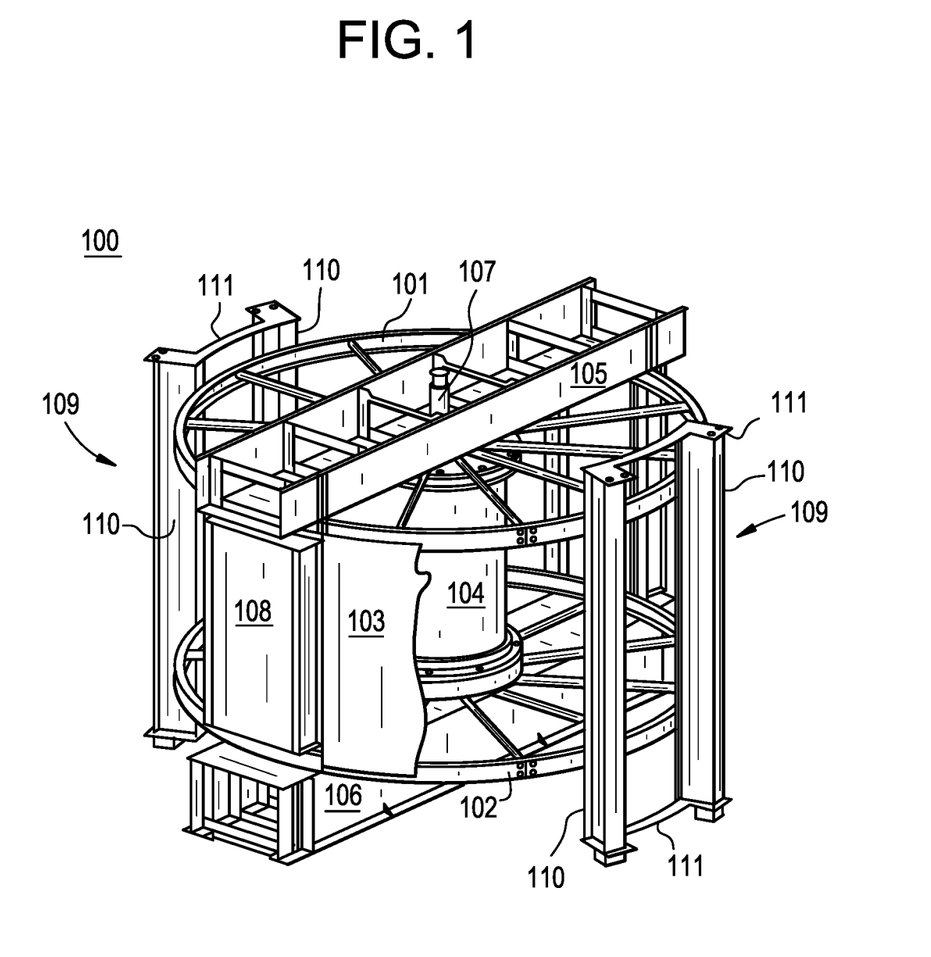
FIG. 1 is a schematic perspective view of a prior art APH design disclosed in US623764B1.

The Spoked Casing Support APH 100 shown in FIG. 1 has spoked support rings 101,102 intended to give some rigidity and form to cylindrical casing 103 which is fabricated from relatively thin sheet steel. Rotor post assembly hub 104 housed within the casing 103 is sandwiched between and supported by upper and lower rotor bearing mountings (not shown) attached respectively to conventional APH center sections 105,106 respectively. The upper center section 105 and lower center section 106 are heavy duty welded sheet steel fabrications being elongate internally braced U-channels extending across and respectively above or below the associated upper and lower spoked support rings 101,102. Although the upper rotor bearing mounting is not illustrated, it will be clear that it rotatingly supports the upper extent of rotor post 107 extending through the base of upper center section 105 and is rigidly attached thereto axially at or above the upper spoked support ring 101. Similarly, the lower bearing mounting is rigidly mounted to the lower center section 106 which self-evidently also bears the static weight of the rotor assembly 104. The upper rotor bearing mounting may be configured to bear some weight of the rotor assembly 104 but principally it is designed to maintain rotor verticality and bear dynamic loadings during operation.

The lower center section 106 is typically resting on or attached indirectly to concrete foundations. The upper center section 105 is rigidly attached to the lower center section 106 by substantial side pedestals 108 fabricated from structural steel plate and disposed radially outwardly of the thin sheet steel casing 103 to which they may be attached by welding, for example. Further support is given to the casing 103 by circumferentially opposed secondary support columns 109 rising from concrete foundations to above the upper spoked support ring 101. The support columns 109 are each fabricated from a pair of vertical beams 110 connected to upper and lower spacing plates 111. It will be understood that the rotor post assembly hub 104 receives its radial support from the center sections 105,106 substantially or nominally along a vertical plane extending radially through the nominal central elongate axis of center sections 105,106. Although most axial load of the rotor is borne directly by the lower center section 106, it will be understood that if the upper bearing supports some rotor weight, then some axial load may be transmitted to lower center section 106 indirectly via the upper center section 105 and side pedestals 108. In any event, the upper center section 105 supports all dynamic rotor loads transmitted via the upper extent of the rotor post 107.

Figure 2:
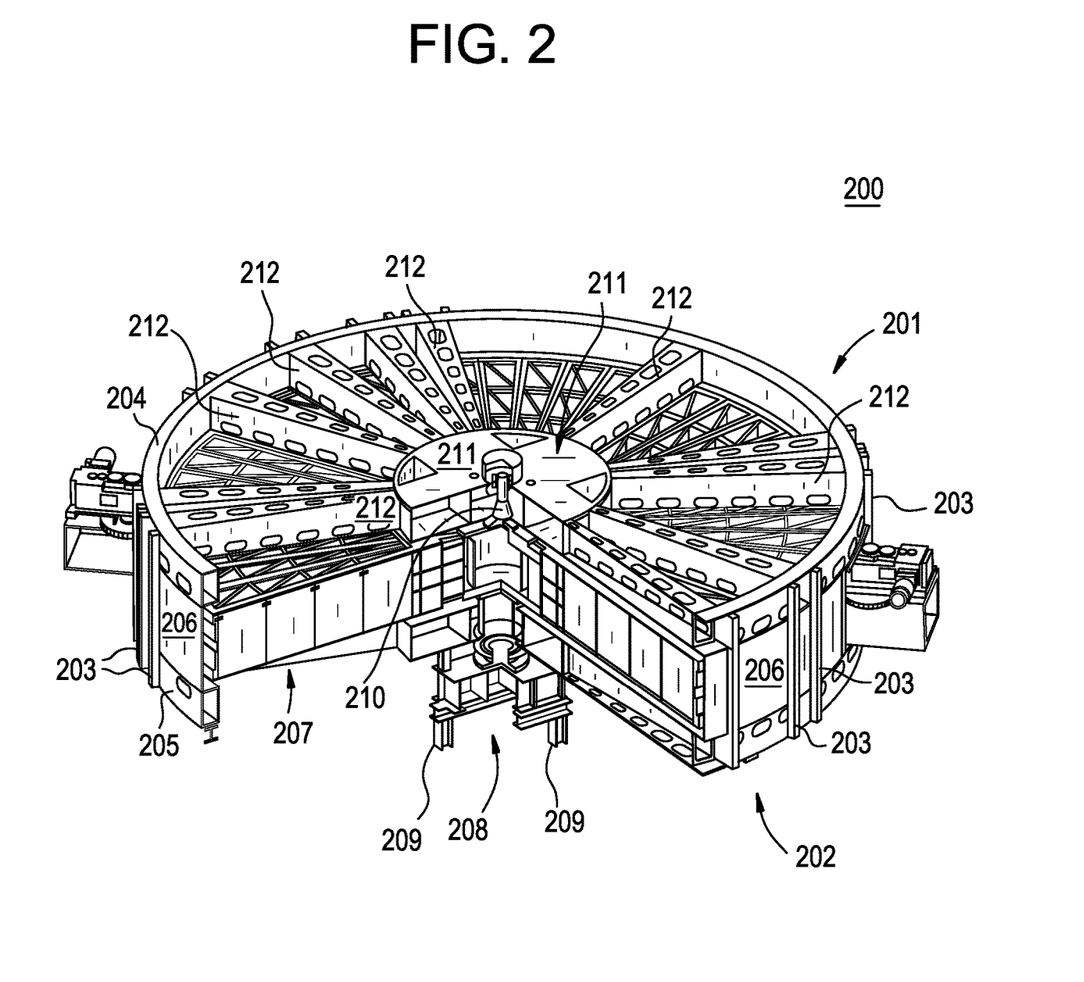
FIG. 2 is a perspective view of Applicant's LoPro™ RAM disclosed in WO2020231381A1, shown in a cut away view with a rotor installed therein.

The LoPro™ RAM 200 shown in FIG. 2 is a low-profile design having a structural spoked upper stator 201 axially spaced apart from a structural spoked lower stator 202 by a plurality of rigidly attached support members 203 extending between the radially outer extents of respectively an outer ring 204 of the upper stator 201 and an outer ring 205 of the lower stator 202. Lightweight sheet steel casing panels 206 are attached to radially inner surfaces of the support members 203 to provide a housing for low profile rotor 207.

The weight of rotor 207 is carried by a lower rotor bearing housing and mounting 208 standing on a plurality of feet 209 anchored to a concrete foundation. The lower stator 202 is anchored to the concrete foundation by a plurality of feet (not shown) on which the lower outer ring 205 stand and by attachment to the mounting 208. The upper extent of rotor post 210 is rotatably supported by an upper rotor bearing housing 211 which acts as the hub of the upper stator 201.

Intermediate the upper rotor bearing housing 211 and the upper outer ring 204 are rigidly attached a circumferentially spaced array of radially extending spokes 212 with their being at least three thereof. Collectively, housing 211, spokes 212 and outer ring 204 provide when rigidly attached to one another a rigid and static structure for the upper stator 201 which can withstand the operational and static bearing loadings of the upper rotor post 210. Although only the structural form of the RAM 200 is discussed, it will be understood from WO2020231381A1 that the number and relative circumferential positioning of spokes 212 is determined by the number of angular disposition of sectors of rotor 207 housing TSA media. The underside of spokes 212 may each carry a respective seal or actuatable seal mechanism required for proper operation of the RAM 200.

Prior art configurations lack some ease of fabrication and servicing. It is one object of the invention to address at least these deficiencies.

SUMMARY OF THE INVENTION

The following embodiments, and others, form the basis of certain aspects of the invention disclosed herein.

One embodiment is directed to a support structure (2) for a rotary regenerative machine or rotary absorption machine (RAM) (1), the support structure (2) comprising: an upper stator (4) and a lower stator (5) axially spaced apart from one another by a first segment (6A) of at least two pedestals (6), the first segment (6A) of each pedestal (6) extending between the upper stator (4) and the lower stator (5), and an upper rotor bearing housing mount (7) disposed above a lower surface (4L) of the upper stator (4), the rotor bearing housing mount (7) is attached to the upper stator (4) by at least one radially extending bearing support structure (8), wherein a radially inner end of at least one of the radially extending bearing support structure (8) is attached to the bearing housing mount (7) and a radially outer end of the at least one radially extending bearing support structure (8) is proximate a top portion (9) of the first segment (6A) of each of the pedestals (6). In one embodiment, a rotor assembly (3) is housed therein.

In one embodiment, the upper rotor bearing housing mount (7) is disposed above an upper surface (4U) of the upper stator (4). In one embodiment, the upper stator (4) has an inner ring (10) and an outer ring (11), the inner ring and outer ring attached to one another by a plurality of radial spokes (12) extending therebetween, and the bearing support structure (8) transmits bearing load axially to the upper stator (4) at or adjacent the inner ring (10).

The support structure (2), in one embodiment, has the upper stator (4) has an inner ring (10) and an outer ring (11), the inner ring and outer ring attached to one another by a plurality of radial spokes (12) extending therebetween, wherein the bearing support structure (8) comprises an axial extending load bearing strut (13) (e.g., vertical strut) and a radially extending and sloped load bearing buttress (14), the radial load bearing buttress (14) extending upwardly from a radially outer periphery of the bearing support structure (8) with an upper portion (13b) of the strut (13) proximate and attached to an upper end portion (14b) of the buttress (14) and wherein the bearing housing mount (7) is: attached to the inner stator ring (10); axially supported by the strut (13); and radially supported by the buttress (14), the buttress (14) attached directly or indirectly to a top surface (15) (or the plate 9P) of a first segment (6A) of a corresponding pedestal (6). In one embodiment, the bearing support structure (8) is attached to the bearing housing mount (7) by a beam (16) extending radially outwardly from the strut (13) and the buttress (14).

In one embodiment, each of the pedestals (6) further comprises a second segment (6B) axially attached to the first segment (6A), wherein a top portion (9A) of the second segment (6B) is proximate the lower stator (5). In an embodiment, at least one of the first segment (6A) of pedestals (6) comprises two parallel columns (17A), each of the two parallel columns (17A) having an upper end, wherein the upper end of each of the two parallel columns (17A) attaches to a connection member (18), and each connection member (18) attaches to the outer stator ring (11) of the upper stator (4) and to the buttress (14).

One embodiment is directed to a modular support structure (2) for a rotary regenerative machine or RAM (1) comprising: an upper module (19) comprising: an upper stator (4), the upper stator (4) configured as a structural support member having a lower surface (4L); an upper rotor bearing housing mount (7) disposed above the lower surface (4L); and at least two support pedestals (6), each pedestal (6) comprising a first segment (6A) having a top portion (9) and a lower portion (20); and a lower module (21) comprising: a lower stator (5); and at least two support pedestals (6), each pedestal (6) comprising a second segment (6B) having a top portion (9A) and a lower portion (20A) wherein once assembled, the upper stator (4) and lower stator (5) are spaced apart by each of the first segments (6A) of pedestals (6), each of the first segments (6A) extending between and attached to the upper stator (4) and the lower stator (5), and each top portion (9) of each first segment (6A) of pedestal (6) is attached to the upper stator (4) and each lower portion (20) of each first segment (6A) of pedestal (6) is attached to the lower stator (5) and the lower portion (20) of the first segment (6A) is attached to the top portion (9A) of the second segment (6B). It is contemplated that a rotor assembly (3) is housed in the modular support structure.

In the upper stator (4) has an inner ring (10) and an outer ring (11) attached to one another by a plurality of radial spokes (12) extending therebetween and in which in use axial bearing loads are transmitted by the upper stator (4) at or adjacent the inner ring (10). In an embodiment, the upper stator (4) of the upper module (19) has a substantially similar geometric shape of the lower stator (5) of the lower module (21).

In one embodiment, the modular support structure further comprises at least one radially extending bearing support structure (8), wherein the at least one radially extending bearing support structure (8) is attached to the mount (7) and a radially outer end of the at least one radially extending bearing support structure (8) is proximate a top portion (9) of a corresponding one of the first segments (6A) of the pedestals (6).

One embodiment is directed to a module (19) for use in a modular support structure (2), the module (19) comprising: an upper stator (4), the upper stator (4) configured as a structural support member having a lower surface (4L); an upper rotor bearing housing mount (7) disposed above the lower surface (4L); and at least two support pedestals (6), each pedestal (6) comprising a first segment (6A) having a top portion (9) and a lower portion (20).

A further embodiment is directed to a rotor assembly (3), for a rotary regenerative machine or RAM (1) comprising: an upper rotor post (30), a lower rotor post (31), an intermediate central portion or hub (32) of larger diameter than the upper rotor post and the lower rotor post, an upper disc beam (33); a lower disc beam (34); and an upper rotor bearing (35) attached to the upper rotor post (30); wherein the hub (32) is positioned between and attached to the upper disc beam (33) and the lower disc beam (34), thereby defining an annular space between the upper disc beam and the lower disc beam. In one embodiment, the annular space is configured to receive at least one insert.

In one embodiment of the rotor assembly, the upper disc beam (33) and the lower disc beam (34) are attached to the hub with one of welding, fasteners, epoxy, soldering and brazing. In one embodiment, the hub (32) has an upper surface (32U) and the upper disc beam (33) is of annular construction with an inner circumferential flange (33F) seating upon an outer periphery of upper surface (32U), and in which hub (32) and the inner circumferential flange (33F) are attached to one another and located in place by a plurality of mechanical fasteners (36).

In one embodiment of the rotor assembly, the hub (32) has a lower surface (32L), the lower disc beam (34) is of annular construction with an inner circumferential flange (34F) seating upon the outer periphery of the lower surface (32L), and in which hub (32) and the inner circumferential flange (34F) are attached to one another and located in place by a plurality of mechanical fasteners (not shown).

Another embodiment is directed to a bracing support structure comprising at least one vertical strut and at least one buttress, each of the at least one vertical struts having a top portion and a lower portion and each one of the at least one buttresses having a top portion and a lower portion, the top portion of a vertical strut attached to the top portion of a buttress. In one embodiment of the bracing support structure, the bottom portion of each of the at least one vertical strut is attached to an upper rotor bearing housing or an upper rotor bearing housing mount and the lower portion of each of the at least one buttresses is attached to an outer ring. Optionally, at least two buttress and strut configurations are connected via a bracing beam that is attached at the top portion of the struts.

DETAILED DESCRIPTION

Figure 3:
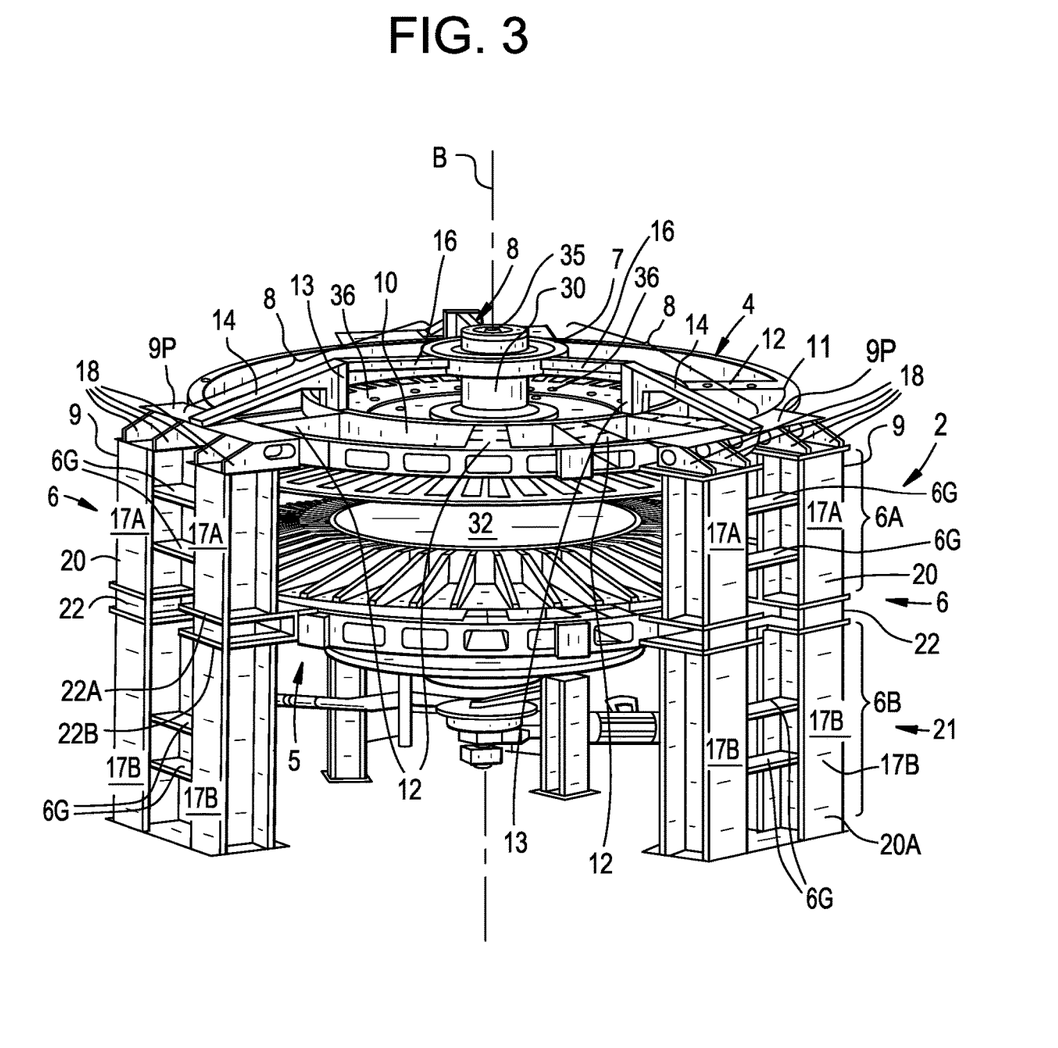
FIG. 3 is a perspective view of a RAM designed in accordance with at least one aspect of the invention with a rotor and drive unit installed therein.
Figure 4:
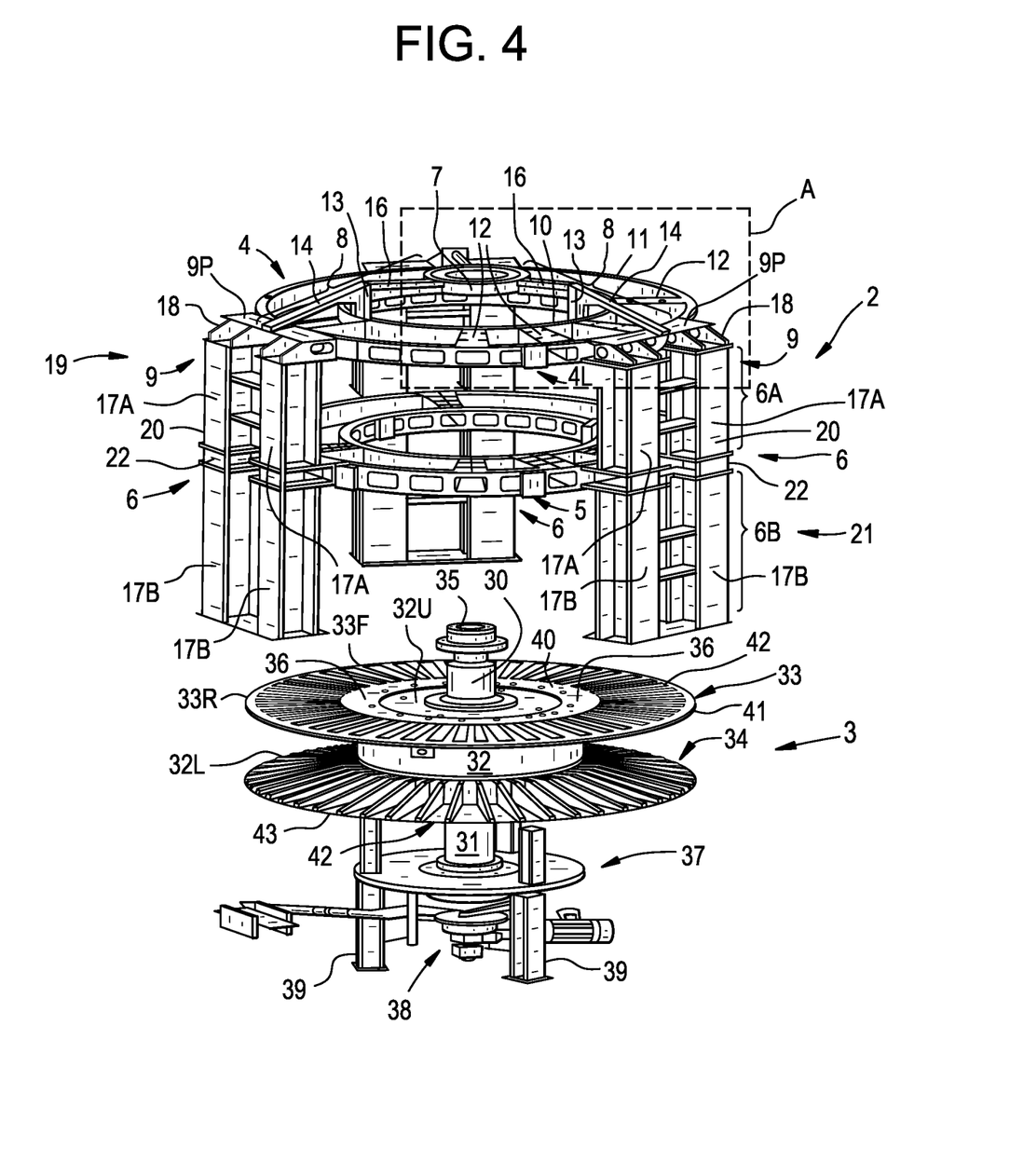
FIG. 4 is an exploded view of a support structure and rotor of the RAM illustrated in FIG. 3.

FIG. 3 and FIG. 4 illustrate a RAM 1, which is a basic design for a rotary regenerative machine in accordance with at least one aspect of the invention. The RAM 1 can be adapted to house TSA media for carbon capture applications for sequestration from a gas stream, e.g., a fossil fueled boiler flue gas stream or an atmospheric air stream.

RAM 1 includes a support structure 2 in which a rotor assembly 3 is rotatably housed (FIG. 4). The support structure 2 has an upper stator 4 and lower stator 5 positioned circumferentially around an axis B. While axis B is portrayed vertically, and the terms "upper", "top" and "lower" are used to describe the position of certain structures herein, it is contemplated that the axis B could be horizontal, and the upper and lower stators would be positioned in a side by side arrangement.

The upper stator 4 and the lower stator 5 are spaced apart in parallel to one another by a first segment 6A of at least two pedestals 6. In one embodiment, as shown in FIGS. 3 and 4, there are three circumferentially equidistant spaced axial load bearing pedestals 6. As shown in FIG. 3 and FIG. 4, each pedestal 6 includes a first segment 6A and an axially aligned second segment 6B. The first segment 6A includes a top portion 9 and a lower portion 20, and the second segment 6B includes a top portion 9A and a lower portion 20A.

In one embodiment, first segment 6A is attached to the second segment 6B by at least one attachment feature 22; however, it is envisioned that the first segment 6A is directly attached to the second segment 6B. The lower portion 20 of first segment 6A is proximate and attached to the top portion 9A of the second segment 6B.

As shown in FIGS. 3-4, the first segment 6A extends from the upper stator 4 to the lower stator 5, where the top portion 9 of the first segment 6A is attached to the upper stator 4 and attachment feature 22 is attached to the lower stator 5. The attachment feature 22 having an upper surface 22A and a lower surface 22B. The shape, configuration, attachment modality and even the utilization of attachment feature 22 should be understood within the scope of the invention to be a matter of design choice.

In one embodiment, the pedestal 6 includes two parallel columns. The first segment 6A of the pedestal 6 includes two parallel columns 17A and the second segment 6B of the pedestal 6 includes two parallel columns 17B. As shown in FIGS. 3 and 4, parallel columns 17A are axially connection to parallel columns 17B by the attachment feature 22, the invention is not limited in this regard as the parallel columns 17A, 17B can be directly connected. The invention is not limited in this regard as one or both segments 6A, 6B of the pedestal 6 can have any number of columns 17.

As shown in FIGS. 3-4, each column 17A is attached to the upper stator 4 through a connection member 18 and is attached to the lower stator 5 through an attachment feature 22. In one embodiment, the column 17A is attached to either or both of the connection members 18 and the attachment feature 22 through welding or detachably attached with mechanical fasteners. As shown in FIGS. 3-4, each pedestal 6 includes a first segment 6A and a second segment 6B. The first segment 6A has two parallel columns 17A. The second segment 6B has two parallel columns 17B. The first segment 6A is attached to the second segment 6B by attachment feature 22. A top end of each column 17A in the first segment 6A is proximate and attached to a connection member 18. In some embodiments, a plate 18P is secured to the connection member 18 of each column 17A and a radially outermost portion of the bearing support structures 8 is secured to the plate 18P. In some embodiments, the column 17A is attached to an adjacent one of the columns 17A by a gusset 6G. Each of the connection members 18 is proximate and attached to the top stator 4. A lower end of each of the parallel columns 17A in the first segment 6A is proximate and attached to a top surface 22A of attachment feature 22. Each of the attachment features 22 is proximate and attached to the lower stator 5. A top end of each of the parallel columns 17B in the second segment 6B is proximate and attached to a lower surface 22B of the attachment feature 22.

Each of the pedestals 6 are anchored in situ at their lowest extent to foundation mountings (not shown) sufficiently robust to withstand the operational forces of a large rotating regenerator machine. It will be understood that whilst it is preferred to have the rotor axis vertical and the parallel axis of the stators 4,5 horizontal, this a mere design choice and in another embodiment the rotor axis could be horizontal, for example. Similarly, it will be understood that the equidistant circumferential spacing of the pedestals 6 and their number is also a matter of design choice. Accordingly, other embodiments of the invention include, e.g., pedestals 6 being spaced in non-equidistant intervals, having more than three pedestals 6, having less than three pedestals 6, and any permutation of quantity of pedestals and various spacing options.

The support structure 2 further includes an upper rotor bearing housing mount 7. The upper rotor bearing housing mount 7 (also referred to herein as "bearing housing mount 7" or "mount 7") is adapted to receive, locate, and anchor either an upper bearing housing or an outer fixed race of an upper bearing. The mount 7 may be housed in the vertical extent of the upper stator 4. In one embodiment, the mount is disposed above a lower surface 4L of the upper stator 4. In another embodiment, the mount is disposed above an upper surface 4U of the upper stator 4.

In the illustrated embodiment, the mount 7 is well above the upper stator 4 to allow egress through openings in the support structure 2 to a void atop the installed rotor assembly 3, which may in part be filled with electrical wiring, pneumatic piping, for example, or any other equipment requiring ready access thereto for construction, servicing and/or repair/replacement. In one embodiment, as more clearly illustrated in FIG. 5, the mount 7 is a stub annulus adapted to receive a bearing outer race and has a cylindrical outer surface 70.

Extending radially outwardly from the mount 7 is at least one radially extending bearing support structure 8. In one embodiment, the bearing support structure 8 extends radially outwardly from the outer surface 70 of mount 7. The mount 7 is attached to the upper stator 4 by the bearing support structure 8. Each bearing support structure 8 extends toward a corresponding top portion 9 of a respective pedestal 6.

Figure 5:
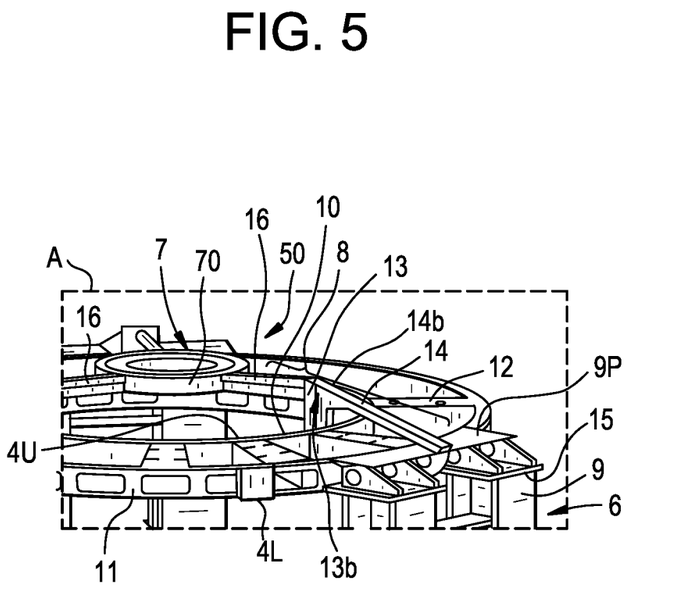
FIG. 5 is an enlarged view of an outlined portion A of FIG. 4.

While three bearing support structures 8 are shown in FIGS. 3-5, the present invention is not limited in this regard as any number of bearing support structures 8 is envisioned, e.g., the number of bearing support structures 8 can be the same, more than, or less than the number of pedestals 6. In one particular embodiment, the number of pedestals 6 corresponds to the number of bearing support structures 8. It is contemplated that each of the bearing support structures 8 is attached directly and permanently to the corresponding top portion 9 of the first segment 6A of pedestal 6, but the invention is not limited in this regard as the attachment could be indirect (i.e., via another element such as a plate 18P is between the pedestal 6 and the bearing support structure 8) and/or temporary. Additionally, it is envisioned that the bearing support structure 8 and the respective first segment 6A of pedestal 6 are attached in an integrally/unitarily made configuration. In some embodiments, a radially outermost portion of the bearing support structures 8 is attached to the plate 18P and is located between two of the parallel pedestals 6.

The term "attachment" or "attached" as used herein includes any type of connection that is appropriate given variables such as materials, use and location. Attachments may be permanent or temporary, e.g., integral/unitary configuration, welding, fasteners, brazing, and the like. Attachments may be direct or indirect, e.g., an attachment may be made between two adjacent parts or indirectly by having an element that is placed or positioned between two parts. In one embodiment, the attachment provides a rigid connection; in another embodiment, the attachment provides a flexible connection.

In one embodiment, rigid attachments transmit upper bearing radial loadings from the mount 7 to the foundation via the pedestals 6.

In one embodiment, each of the bearing support structures 8 includes an axial extending load bearing strut 13 and a radial load bearing buttress 14. In one embodiment, the bearing support structure 8 also includes a beam 16. The radial load bearing buttress 14 extends upwardly from a radially outer periphery of the bearing support structure 8 with an upper portion 13b of the strut 13 proximate and attached to an upper end portion 14b of the buttress 14. While not shown, it is envisioned that in the space created between the buttress 14 and the strut 13, there is a bracing feature that completely or partially fills that space. The bracing feature could be a webbing, a lattice, a sheet (e.g. a metal sheet) or any object or objects that can extend and/or fill the space and provide support to the strut 13 and the buttress 14 and/or any adjacent features. The bearing housing mount 7 is attached to the inner stator ring 10, e.g., through the support structures 8. The strut 13 axially supports the bearing housing mount 7. The mount 7 is radially supported by the buttress 14. As shown in FIG. 5, in one embodiment, the buttress 14 is attached to a top surface 15 of the first segment 6A of a pedestal 6.

The stators 4,5 of RAM 1 are of structural spoked design. Upper stator 4 is annular and includes an inner ring 10 and outer ring 11. The inner ring 10 and the outer ring 11 are connected by a plurality of load bearing radial spokes 12 extending therebetween and attached thereto. Radially aligned with each pedestal 6 a corresponding vertical strut 13 extends upwardly from the inner ring 10 and is attached thereto, e.g., by welding. A buttress 14 is attached to an upper portion 13b of the strut and extends radially outwardly and downwardly from the upper portion 13b and attaches to top surface 15 of the respective first segment 6A of a pedestal 6. Extending radially inwardly from each vertical strut 13 and buttress 14 and attaching them to outer surface 70 of mount 7 is beam 16, which is horizontal and runs parallel to upper stator 4.

The vertical strut 13, buttress 14 and beam 16 cooperate with the structural upper stator 4 to transmit dynamic axial and radial loadings of the rotor assembly 3 from the mount 7 to the pedestals 6 anchored to foundations in situ. As noted above, in one embodiment, first segment 6A of the pedestals 6 include two parallel columns 17A attached at their upper ends by a connection member 18. The connection member 18 in situ attaches, and in one embodiment, rigidly connects, the respective pedestal 6 to the outer ring 11 or upper stator 4 by welding or mechanical fasteners. Each buttress 14 is, at its radially outer end, attached to the corresponding connection member 18. In one embodiment, the buttress 14 is rigidly attached to a connection member 18. In one embodiment, the rigid attachment of the buttress 14 is permanently by welding or removably attached by mechanical fasteners to the corresponding connection member 18. In certain embodiments, a plate 18P extends between and is attached to the top portions 9 of two of the pedestals 6.

In a prototype version of the illustrated RAM 1, the stators 4,5 are about 4 meters in diameter and the radial spokes 12 are short or about 1 meter in length radially. However, to increase carbon capture capacity, it might be desirable to have stators of upward of twenty (20) meters in diameter, which would require long radial spokes about or upward of eight (8) meters in length housing a large rotor assembly of commensurately greater diameter than that of rotor assembly 3. In yet another embodiment, a RAM (not shown) has upper and lower stators of structural spoked design like stators 4,5 of RAM 1 and long radial spokes similar to spokes 12. Assuming the large rotor assembly of this embodiment as compared to rotor assembly 3 of RAM 1 is of increased diameter commensurate with the comparative length of its spokes but of similar axial depth, its weight will in comparison be close to 400 times that of rotor assembly 3. Advantageously, an equivalent structure to that of vertical strut 13, buttress 14 and beam 16 of RAM 1 cooperate with the structural upper stator to transmit the great weight of the large rotor assembly.

In such an embodiment, it is envisioned that spokes 12 will be longer and thicker than what is depicted in, e.g., FIGS. 3-5. Longer spokes than spokes 12 bear greater weight and dynamic loadings than rotor assembly 3 and will need to meet maximum desired flexure requirements to ensure required structural rigidity and the operational limitations of sealing systems employed. Self-evidently, the spokes in this embodiment of this RAM must cooperate with immediately adjacent bearing support structures (being equivalent to the bearing support structures 8 of RAM 1) and be robust enough to withstand the great weight and attendant dynamic loading of its rotor assembly being of about twenty (20) meters in diameter with no more than the maximum desired flexure of the spokes. To achieve comparable end-to-end flexure in operation, these long spokes if constructed of a rigid metal such as steel in box girder, I-beam or functionally like load bearing structural form will have an increased weight commensurate with their length and increased loadings of the accompanying rotor assembly as compared to the short spokes 13 of RAM 1.

It is envisioned that a reduced bending moment for the spokes is desirable than would be the case by adopting an enlarged version of the vertical strut 13, buttress 14 and beam 16 arrangement of the bearing support structures 8 of RAM 1. This could be achieved by having in this embodiment together with the required bearing support structures additional buttressed bracing supports structures each rigidifying an associated spoke or immediately adjacent spokes whilst providing no additional support to the bearing mount of the RAM. These additional buttressed bracing supports would each connect the ends directly or indirectly of one spoke or an immediately adjacent pair of spokes respectively to the inner stator and outer stator providing structural rigidity to the spoke(s). A structure 400 for the buttressed bracing supports as shown generally in FIG. 6 could each comprise a vertical strut 413 and buttress 414 (not unlike vertical strut 13, buttress 14 of RAM 1) that is also connected to the bearing mount with a radially bracing beam 416 (similar to beam 16), free floating relative to the bearing mount or connected to another buttressed bracing support diametrically opposite to provide a radially braced structure comprising two such buttressed bracing supports. In a still further embodiment, a RAM has buttressed bracing supports of spokes as generally herein described without any bearing support structures as required in RAM 1.

Figure 6:
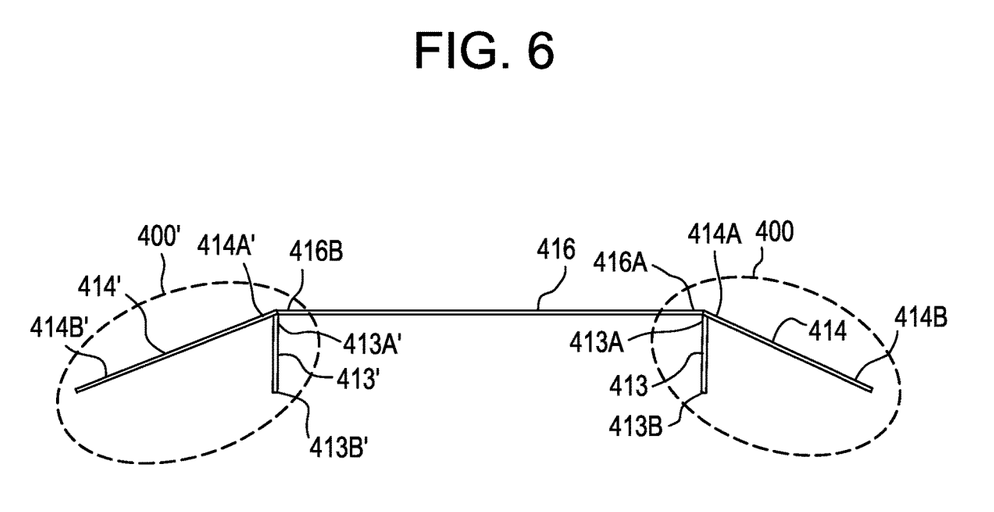
FIG. 6 is a perspective view of a bracing support structure that can be utilized with the LoPro™ RAM or the RAM illustrated in FIGS. 3-5.

A first of the buttressed bracing supports 400 has a first vertical strut 413 that extends from a first top end 413A to a first bottom end 413B and a first radially extending buttress 414 that extends from a first upper end 414A to a first anchor end 414B. The first upper end 414A is connected to the first top end 413A of the first vertical strut 413. The first anchor end 414B is connected to a first of the top portion 9 of one of the first segments 6A; and the first bottom end 413B of the first vertical strut 413 being connected to a first portion of the upper rotor bearing housing mount 7.

In some embodiments, a second of the buttressed bracing supports 400' has a second vertical strut 413' that extends from a second top end 413B' to a second bottom end (413B') and a second radially extending buttress 414' extends from a second upper end 414A' to a second anchor end 414B'. The second upper end 414A' is connected to the second top end 413A' of the second vertical strut 413'. The second anchor end 414B' is connected to a second of the top portion 9' of another of the first segments 6A; and the second bottom end 413B' of the second vertical strut 413' is connected to a second portion of the upper rotor bearing housing mount 7.

In some embodiments, a bracing beam 416 extends from a first beam end 416A to a second beam end 416B. The first beam end 416A is connected to the first top end 413B of the first vertical strut 413 and the second beam end 416B is connected to the second top end 413B' of the second vertical strut 413'.

Figure 2A:
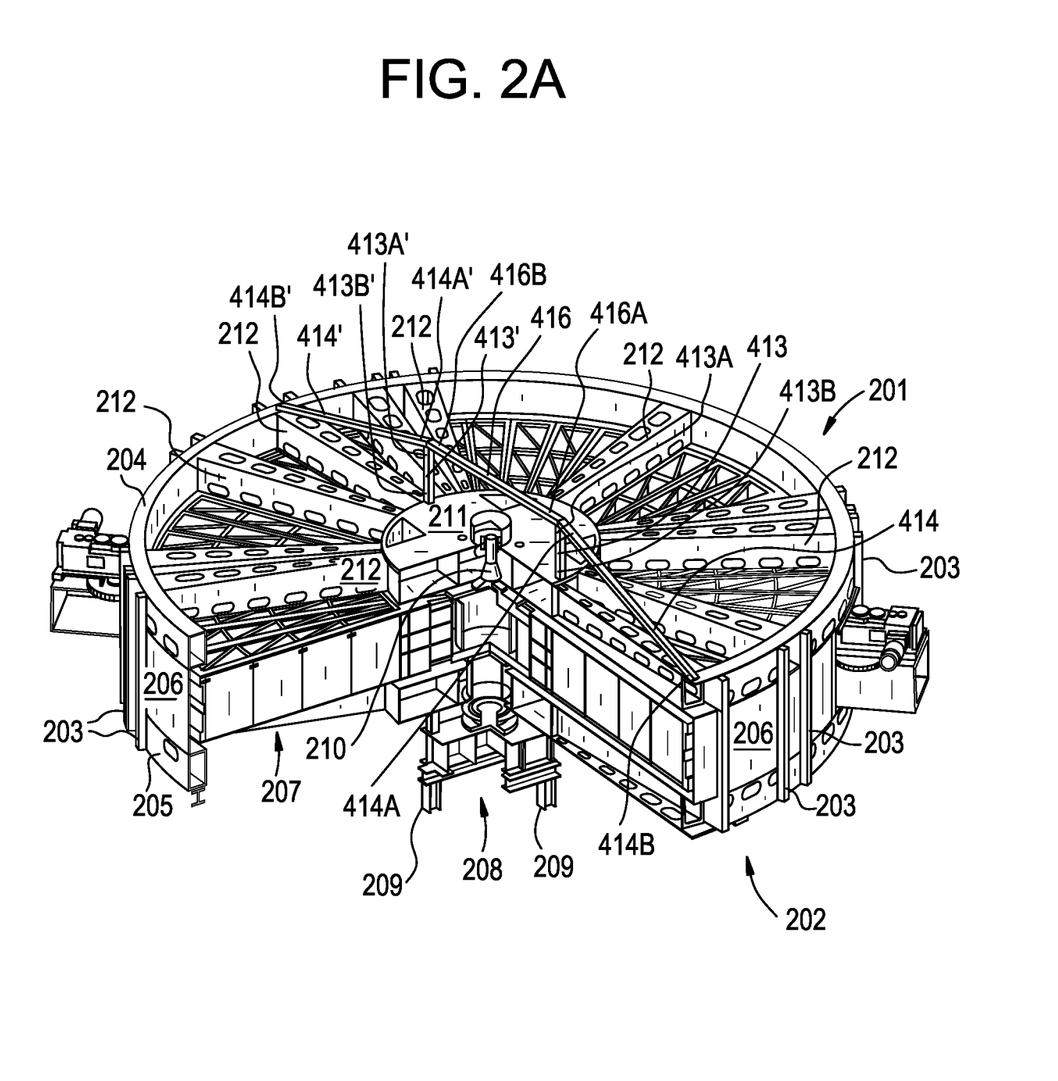
FIG. 2A is a perspective view of Applicant's LoPro™ RAM disclosed in WO2020231381A1, shown in a cut away view with a rotor installed therein and a bracing support structure as disclosed herein.

In still yet another further embodiment, as shown in FIG. 2A, a large diameter RAM similar to Applicant's LoPro™ RAM 200 shown in FIG. 2 could have a plurality of circumferentially spaced radially braced structures attached rigidly directly or indirectly to one another to define a cage having buttressed outriggers extending radially outwardly of a void disposed above the central hub of the upper spoked stator. Conveniently, the upper bearing could be disposed in or below said void above or below an upper surface of said upper spoked sector. The bearing could also be supported by bearing support structures in accordance with other aspects of the invention.

The structure shown in FIG. 6 is shown in FIG. 2A as installed on the LoPro™ RAM 200 of FIG. 2. Additionally, the structure shown in FIG. 6 can be installed on the RAM 1 by attaching the buttress to the outer ring 11, attaching the vertical struts to the inner ring 10 or radial spokes 12, and straddling the mount 7.

As shown in FIG. 2A, a support structure 200 for a rotary regenerative heat exchanger 207 includes an upper section 201 comprising an upper ring 203 having a first exterior surface 22, a rotor bearing housing 211 and three or more upper spokes 212, each extending between and secured at respective ends thereof to the upper ring 203 and the rotor bearing housing 211. The support structure 200 includes a lower section 202 that is configured to be supportable in use by a foundation mounting structure 208,209 mounted on a foundation. The lower section 202 is spaced apart from the upper section 201. The support structure 200 includes a plurality of support members 70. Each of the plurality of support members 70 is fixedly secured, directly or indirectly, to the upper ring 203 and the lower section 202, thereby creating an annular space between the upper ring 203 and the lower section 202. The annular space is configured to receive compartments of a rotor assembly. The rotor bearing housing 211, the upper spokes 212 and the support members 70 cooperate to provide rigidity to the support structure 200 such that the support members 70 cooperate to support and transmit the weight of the upper spokes 212, the upper ring 203 and the rotor bearing housing 211 to the lower section 202. In some embodiments, a first buttressed bracing support 400 has a first vertical strut 413 extending from a first top end 413A to a first bottom end 413B. The first buttressed bracing support 400 has a first radially extending buttress 414 extending from a first upper end 414A to a first anchor end 414B. The first upper end 414A is connected to the first top end 413A of the first vertical strut 413. The first anchor end 414B is connected to a first portion of the upper ring 202; and the first bottom end 413B of the first vertical strut 413 being connected to a first portion of the rotor bearing housing 211.

In some embodiments, a second buttressed bracing support 400' having a second vertical strut 413' extending from a second top end 413B' to a second bottom end 413B' and a second radially extending buttress 414' extending from a second upper end 414A' to a second anchor end 414B', the second upper end 414A' is connected to the second top end 413A' of the second vertical strut 413'. The second anchor end 414B' is connected to a second portion of the upper ring (202); and the second bottom end 413B' of the second vertical strut 413' being connected to a second portion of the rotor bearing housing 211.

In some embodiments, a bracing beam 416 extends from a first beam end 416A to a second beam end 416B. The first beam end 416A is connected to the first top end 413B of the first vertical strut 413 and the second beam end 416B is connected to the second top end 413B' of the second vertical strut 413'.

In one embodiment, the pedestals 6 extend from the upper extent of the RAM to the foundation(s) on which it is installed, similar to the pedestals 108 of conventional APH 100. In the currently illustrated embodiment, a modular design is disclosed which embodies a second aspect of the invention having a support structure 2 which includes a first upper module 19 which at a lower portion 20 of the first segment 6A of pedestals 6 is attached to a second segment 6B of pedestals 6 of a second lower module 21. For ease of transport, in one embodiment, the upper module 19 and lower module 21 are removably attachable to one another, via, e.g., attachment feature 22. In one embodiment, the attachment features 22 are between and connect the first module 19 to the second module 21. The attachment features 22 are also attached to the lower stator 5.

Once assembled, it should be appreciated that the two modules 19,21 could be permanently welded together. The invention is not limited in this regard as it is envisioned that in another embodiment, the upper module 19 and the lower module 21 are unitarily/integrally manufactured, i.e., manufactured in one piece.

In another embodiment, the modular construction does not include the bearing support structures 8 and the buttresses 14 as herein described without departing from the essence of this second aspect of the invention.

FIG. 4 illustrates a rotor assembly 3 embodying another aspect of the invention which could be used in a RAM design (not shown) that unlike RAM 1 does not embody the other aforedescribed aspects of the invention. The rotor assembly 3 is of modular construction and an upper rotor post 30, a lower rotor post 31, a large diameter cylindrical intermediate central portion or hub 32, an upper disc beam 33 and a lower disc beam 34. The hub 32 is positioned between and attached to the upper disc beam 33 and the lower disc beam 34 and defines an annular space therebetween. In one embodiment, the annular space 42 in the upper disc beam 33 and/or the annular space in the lower disc beam 34 includes media removably positioned therein, e.g., heat transfer media, regenerative media, absorption media, chemically reactive media.

In use, the rotor assembly 3 is supported rotationally at its upper end by an upper rotor bearing 35 which is mounted to the upper rotor post 30 and to rotor bearing housing mount 7. Additionally, rotor assembly 3 is supported both rotationally and axially at its lower end by a lower rotor bearing support assembly 37 with which a drive gearbox unit 38 and drive pedestals 39.

The cylindrical hub 32 has a horizontal or level upper surface 32U and a horizontal or level lower surface 32L. The upper disc beam 33 is a ring having an inner circumferential flange 33F and an outer circumferential edge 33R with a plurality of radial slots or openings 42 positioned between the inner circumferential flange 33F and the outer circumferential edge 33R, the inner circumferential flange 33F being attached to the hub 32. Parallelly disposed below the upper disc beam 33 is lower disc beam 34. Lower disc beam 34 includes an inner circumferential flange 34F and an outer circumferential edge 34R with a plurality of radial slots or openings 42 positioned between the inner circumferential flange 34F and the outer circumferential edge 34R, the inner circumferential flange 34F being attached to the hub 32. The openings 42 in the upper disc beam 33 are axially aligned with the openings 42 in the lower disc beam 34.

As shown in FIG. 4, in one embodiment, a ring of mechanical fasteners 36 adjacent the periphery of hub 32 secures suitably by bolting the inner circumferential flange 33F of upper disc beam 33 to the hub's upper surface 32U. Similarly, a ring of mechanical fasteners (not shown) secures by bolting the inner circumferential flange 34F of lower disc beam 34 to the hub's lower surface 32L. The invention is not limited in this regard as the upper disc beam 33 and/or the lower disc beam 34 can be attached to the hub 32 by welding, epoxy, soldering or brazing.

The beams 33, 34 are a matched pair and each of annular unitary construction with an inner annular portion 40 radially coextensive with the hub 32, a removable TSA media container, holder, basket, cassette or cartridge receiving annular portion 41 intermediate the inner portion 40 and the circumferential edge 33R, 34R of the beam 33 or 34 and having the plurality of radial slots 42 through which a $CO_2$ bearing gas (e.g., flue gas, atmospheric gas and sequestration gas carrying $CO_2$ liberated by TSA media) can pass. Each of the beams 33, 34 have a plurality of radial vanes 43 axially coextensive with hub 32 attached to the beam in between immediately adjacent slots 42 and extending axially away therefrom to define partial sidewalls of compartments for removable containers of TSA media which operationally are axially gas permeable. It will be apparent from FIG. 4, that the vanes 43 of upper beam 33 extend downwardly therefrom coextensive with hub 32 and those vanes 43 of lower beam 34 extend upwardly therefrom similarly coextensive with hub 32 so that compartments are defined in between beams 33 and 34 which surround the outer periphery of hub 32.

Referring once more to the earlier embodiments of the invention, the bearing support structures 8 could be of unitary/integrated design or of welded fabrication. However, as shown clearly in FIG. 5, for ease of transport and on-site assembly, the mount 7 and the beams 16 are constructed as a single welded component 50 and the vertical strut 13 and buttress 14 are constructed together as a separate welded component 51. During assembly, paired components 50, 51 are bolted together by fasteners 52. In another embodiment (not shown), without departing from the essence of this aspect of the invention, the buttress 13 could connect the pedestals 6 to the upper rotor bearing housing mount 7, thereby dispensing with the need for a separate beam 16.

As will be apparent to those skilled in the art, various modifications, adaptations, and variations of the foregoing specific disclosure can be made without departing from the scope of the invention claimed herein. The various features and elements of the invention described herein may be combined in a manner different than the specific examples described or claimed herein without departing from the scope of the invention. In other words, any element or feature may be combined with any other element or feature in different embodiments, unless there is an obvious or inherent incompatibility between the two, or it is specifically excluded.

References in the specification to "one embodiment," "an embodiment," etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described.

The singular forms "a," "an," and "the" include plural reference unless the context clearly dictates otherwise. Thus, for example, a reference to "a plant" includes a plurality of such plants. It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition, or step being referred to is an optional (not required) feature of the invention.

The term "and/or" means any one of the items, any combination of the items, or all of the items with which this term is associated. The phrase "one or more" is readily understood by one of skill in the art, particularly when read in context of its usage.

Each numerical or measured value in this specification is modified by the term "about." The term "about" can refer to a variation of +5%, +10%, +20%, or +25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

Terms that refer to direction or position, i.e., vertical, horizontal, upper, lower, etc., are used for convenience for the reader and are not meant to limit the structure or function of the invention in any manner unless specifically stated herein.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents of carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third, and upper third, etc.

As will also be understood by one skilled in the art, all language such as "up to," "at least," "greater than," "less than," "more than," "or more," and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, as used in an explicit negative limitation.

What is claimed is:

1. A support structure for a rotary regenerative machine or rotary absorption machine (RAM), the support structure comprising:
    an upper stator and a lower stator axially spaced apart from one another by a first segment of at least two pedestals, the first segment of each pedestal extending between the upper stator and the lower stator, and
    an upper rotor bearing housing mount disposed above a lower surface of the upper stator, the rotor bearing housing mount is attached to the upper stator by at least one radially extending bearing support structure,
    wherein a radially inner end of at least one of the radially extending bearing support structure is attached to the bearing housing mount and a radially outer end of the at least one radially extending bearing support structure is proximate a top portion of the first segment of each of the pedestals.

2. The support structure in accordance with claim 1, wherein the upper rotor bearing housing mount is disposed above an upper surface of the upper stator.

3. The support structure in accordance with claim 1, wherein the upper stator has an inner ring and an outer ring, the inner ring and outer ring attached to one another by a plurality of radial spokes extending therebetween, and
    wherein the bearing support structure transmits bearing load axially to the upper stator at or adjacent the inner ring.

4. The support structure in accordance with claim 1, wherein the upper stator has an inner ring and an outer ring, the inner ring and outer ring attached to one another by a plurality of radial spokes extending therebetween;
    wherein the bearing support structure comprises an axial extending load bearing strut and a radial load bearing buttress, the radial load bearing buttress extending upwardly from a radially outer periphery of the bearing support structure with an upper portion of the strut proximate and attached to an upper end portion of the buttress;
    wherein the bearing housing mount is attached to the inner stator ring; axially supported by the strut; and radially supported by the buttress, the buttress attached directly or indirectly to a top surface of a first segment of a corresponding pedestal.

5. The support structure in accordance with claim 3, wherein the bearing support structure is attached to the bearing housing mount by a beam extending radially outwardly from the strut and the buttress.

6. The support structure in accordance with claim 1, wherein each of the pedestals further comprises a second segment axially attached to the first segment, wherein a top portion of the second segment is proximate the lower stator.

7. The support structure in accordance with claim 1, wherein at least one the first segment of pedestals comprises two parallel columns, each of the two parallel columns having an upper end, wherein the upper end of each of the two parallel columns attaches to a connection member, and each connection member attaches to the outer stator ring of the upper stator and to the buttress.

8. The support structure in accordance with claim 1, wherein a rotor assembly is housed therein.

9. The support structure in accordance with claim 1, being a modular support structure for a rotary regenerative machine or RAM comprising:
an upper module comprising:
an upper stator, the upper stator configured as a structural support member having a lower surface;
an upper rotor bearing housing mount disposed above the lower surface; and
at least two support pedestals, each pedestal comprising a first segment having a top portion and a lower portion; and
a lower module comprising:
a lower stator; and
at least two support pedestals, each pedestal comprising a second segment having a top portion and a lower portion wherein once assembled, the upper stator and lower stator are spaced apart by each of the first segments of pedestals, each of the first segments extending between and attached to the upper stator and the lower stator, and
each top portion of each first segment of pedestal is attached to the upper stator and each lower portion of each first segment of pedestal is attached to the lower stator and the lower portion of the first segment is attached to the top portion of the second segment.

10. The modular support structure in accordance with claim 9, wherein the upper stator has an inner ring and an outer ring attached to one another by a plurality of radial spokes extending therebetween and in which in use axial bearing loads are transmitted by the upper stator at or adjacent the inner ring.

11. The modular support structure in accordance with claim 9, wherein the upper stator of the upper module has a substantially similar geometric shape of the lower stator of the lower module.

12. The modular support structure in accordance with claim 9, wherein a rotor assembly is housed therein.

13. The modular support structure in accordance with claim 9, further comprising at least one radially extending bearing support structure, wherein the at least one radially extending bearing support structure is attached to the mount and a radially outer end of the at least one radially extending bearing support structure is proximate a top portion of a corresponding one of the first segments of the pedestals.

14. The support structure in accordance with claim 8, wherein the rotor assembly, comprises:
an upper rotor post,
a lower rotor post,
an intermediate central portion or hub of larger diameter than the upper rotor post and the lower rotor post,
an upper disc beam;
a lower disc beam; and
an upper rotor bearing attached to the upper rotor post;
wherein the hub is positioned between and attached to the upper disc beam and the lower disc beam, thereby defining an annular space between the upper disc beam and the lower disc beam.

15. The support structure in accordance with claim 14, wherein the upper disc beam and the lower disc beam of rotor assembly are attached to the hub with one of welding, fasteners, epoxy, soldering and brazing.

16. The support structure in accordance with claim 14, wherein the hub of rotor assembly has an upper surface and the upper disc beam of rotor assembly is of annular construction with an inner circumferential flange seating upon an outer periphery of upper surface, and in which hub and the inner circumferential flange are attached to one another and located in place by a plurality of mechanical fasteners.

17. The support structure in accordance with claim 14, wherein the hub of rotor assembly has a lower surface, the lower disc beam of rotor assembly is of annular construction with an inner circumferential flange seating upon the outer periphery of the lower surface, and in which hub and the inner circumferential flange are attached to one another and located in place by a plurality of mechanical fasteners (not shown).

18. A modular support structure for a rotary regenerative machine or RAM comprising:
an upper module comprising:
an upper stator, the upper stator configured as a structural support member having a lower surface;
an upper rotor bearing housing mount disposed above the lower surface; and
at least two support pedestals, each pedestal comprising a first segment having a top portion and a lower portion; and
a lower module comprising:
a lower stator; and
at least two support pedestals, each pedestal comprising a second segment having a top portion and a lower portion wherein once assembled, the upper stator and lower stator are spaced apart by each of the first segments of pedestals, each of the first segments extending between and attached to the upper stator and the lower stator, and
each top portion of each first segment of pedestal is attached to the upper stator and each lower portion of each first segment of pedestal is attached to the lower stator and the lower portion of the first segment is attached to the top portion of the second segment.

19. A rotor assembly, for a rotary regenerative machine or RAM comprising:
an upper rotor post,
a lower rotor post,
an intermediate central portion or hub of larger diameter than the upper rotor post and the lower rotor post,
an upper disc beam;
a lower disc beam; and
an upper rotor bearing attached to the upper rotor post;
wherein the hub is positioned between and attached to the upper disc beam and the lower disc beam, thereby defining an annular space between the upper disc beam and the lower disc beam.

20. The support structure of claim 1, further comprising a first buttressed bracing support having a first vertical strut extending from a first top end to a first bottom end and a first radially extending buttress extending from a first upper end to a first anchor end, the first upper end being connected to the first top end of the first vertical strut;
the first anchor end being connected to a first of the top portion of one of the first segments; and
the first bottom end of the first vertical strut being connected to a first portion of the upper rotor bearing housing mount.

21. The support structure of claim 20, further comprising a second buttressed bracing support having a second vertical strut extending from a second top end to a second bottom end and a second radially extending buttress extending from a second upper end to a second anchor end, the second upper end being connected to the second top end of the second vertical strut;

the second anchor end being connected to a second of the top portion of a second of the first segment; and the second bottom end of the second vertical strut being connected to a second portion of the upper rotor bearing housing mount.

22. The support structure of claim 21, further comprising a bracing beam extending from a first beam end to a second beam end, the first beam end being connected to the first top end of the first vertical strut and the second beam end being connected to the second top end of the second vertical strut.

23. A support structure for a rotary regenerative heat exchanger, the support structure comprising:

an upper section comprising an upper ring having a first exterior surface, a rotor bearing housing and at least three upper spokes each extending between and secured at respective ends thereof to the upper ring and the rotor bearing housing;

a lower section configured to be supportable in use by a foundation mounting structure mounted on a foundation, with the lower section being spaced apart from the upper section; and a plurality of support members, each of the plurality of support members being fixedly secured, directly or indirectly, to the upper ring and the lower section, thereby creating an annular space between the upper ring and the lower section, the annular space being configured to receive compartments of a rotor assembly;

wherein the rotor bearing housing, the upper spokes and the support members cooperate to provide rigidity to the support structure such that the support members cooperate to support and transmit the weight of the upper spokes, the upper ring and the rotor bearing housing to the lower section;

a first buttressed bracing support having a first vertical strut extending from a first top end to a first bottom end and a first radially extending buttress extending from a first upper end to a first anchor end, the first upper end being connected to the first top end of the first vertical strut;

the first anchor end being connected to a first portion of the upper ring; and the first bottom end of the first vertical strut being connected to a first portion of the rotor bearing housing.

24. The support structure of claim 23, further comprising a second buttressed bracing support having a second vertical strut extending from a second top end to a second bottom end and a second radially extending buttress extending from a second upper end to a second anchor end, the second upper end being connected to the second top end of the second vertical strut;

the second anchor end being connected to a second portion of the upper ring; and the second bottom end of the second vertical strut being connected to a second portion of the rotor bearing housing.

25. The support structure of claim 24, further comprising a bracing beam extending from a first beam end to a second beam end, the first beam end being connected to the first top end of the first vertical strut and the second beam end being connected to the second top end of the second vertical strut.

* * * * *